United States Patent [19]

Maddux

[11] 3,961,126

[45] June 1, 1976

[54] APPARATUS AND METHOD FOR INCREASING ELECTRIC POWER IN AN ELECTRIC GLASS-MELTING FURNACE

[75] Inventor: John F. Maddux, Heath, Ohio

[73] Assignee: Owens-Corning Fiberglas Corporation, Toledo, Ohio

[22] Filed: Feb. 24, 1975

[21] Appl. No.: 552,083

Related U.S. Application Data

[63] Continuation-in-part of Ser. No. 475,674, June 3, 1974, abandoned.

[52] U.S. Cl. .......................................... 13/6
[51] Int. Cl.² .......................................... C03B 5/02
[58] Field of Search .......................................... 13/6, 23

[56] References Cited

UNITED STATES PATENTS

| | | | |
|---|---|---|---|
| 2,761,890 | 9/1956 | LaBurthe | 13/6 |
| 3,328,153 | 6/1967 | Augsburger | 13/6 X |

*Primary Examiner*—R. N. Envall, Jr.
*Attorney, Agent, or Firm*—John W. Overman; Charles F. Schroeder; David H. Wilson

[57] ABSTRACT

Electric power dissipation in a mass of molten glass is increased where two or more power sources are each connected to at least two electrodes in the molten glass, by cross connecting the sources so that electrodes connected to each source and at proper potentials during a portion of each power signal period are connected together. The interconnection enables a substantial increase in voltage applied to localized regions of the molten glass without requiring higher voltage sources. Interconnection of single phase sources and two typical forms of interconnection of three phase power sources are disclosed.

25 Claims, 6 Drawing Figures

APPARATUS AND METHOD FOR INCREASING ELECTRIC POWER IN AN ELECTRIC GLASS-MELTING FURNACE

CROSS-REFERENCE TO RELATED APPLICATION

This application is a continuation-in-part of U.S. patent application Ser. No. 475,674 filed June 3, 1974 now abandoned in the name of John F. Maddux and entitled "Apparatus and Method for Increasing Electric Power in an Electric Glass Melting Furnace".

BACKGROUND OF THE INVENTION

1. Field of the Invention

This invention relates to electric furnaces for heating molten glass and their methods of operation and more particularly to the interconnection of current source outputs for increasing electric power available for Joule 2. Description of the Prior Art In the manufacturing of glass, an electric furnace may be utilized to melt a batch of raw materials in a refractory lined furnace chamber. Although hydrocarbon fuel burning furnaces may also be utilized to produce glass, the electric furnace has certain advantages with respect to the problems of air pollution and maintenance of uniform heating.

Typically, an electric furnace will have two or more electrodes submerged in the molten glass which are connected to a source of alternating current. The resistivity of the molten glass transfers the electrical energy of the current flowing between electrodes into heat energy thereby creasing Joule effect heating. Molten glass has a negative temperature coefficient and therefore, the resistivity below a critical temperature is sufficiently high so as to limit current flow below a level at which electric melting can be sustained. The power supplied to the furnace chamber can be regulated by phase controlling the applied voltage with suitable means, typically silicon controlled rectifiers. Since, during normal operation, the phase control is operating at 92% to 95% of the voltage cycle to obtain a favorable power factor and the power supplies and phase controls are operated at or near their ratings, neither the current flow nor the voltage can be increased significantly to raise the temperature of the molten glass. Thus, for example, when the molten glass falls below the critical temperature, its molten state has not been maintained electrically. Therefore, electric furnaces generally require a plurality of fuel burners positioned to direct radiant heat to the upper surface of the material in the furnace chamber. This radiant heat melts the material until the critical temperature is reached above which the resistivity of the molten glass is low enough to permit sufficient current to flow between the electrodes for normal controlled electric heating furnace operation.

Glass which is utilized in the production of glass wool often has alkali metals, such as sodium or potassium, added as a flux to facilitate melting of the batch material and to lower the viscosity of the molten glass to decrease production time. These alkali metals also cause the molten glass to have low resistivity which aids the melting process in an electric furnace. However, some glasses, typically those utilized for the manufacture of continuous filaments, generally referred to as "E" glass, have less than 1% alkali metal content and therefore exhibit relatively high resistivity as compared to the wool glass, for example, 10 to 12 times that of wool glass even at melting and refining temperatures. Further, a wool glass may normally be refined at about 2500°F and for a given set of parameters for electrical melting reaches a critical temperature below which electrical melting retrogresses at about 2300°F while E glass will be refined to about 2600°F and have a critical temperature of about 2400°F for those parameters.

However, the use of fuel burners creates undesirable combustion products and emissions from the batch material. Fluorine is often added to E glass as a flux to aid in placing some of the components of the batch materials in solution, to reduce bubbles in the molten glass and to reduce the viscosity of the molten glass. During the melting and refining process much of this fluorine is driven off with boron and other elements which may also be included in the batch material. In order to militate against these factors, glass melting and refining is performed in electric furnaces employing a cold top wherein a layer of batch material covers substantially the entire upper surface of the molten glass and batch material is added to the upper surface as the lower surface of the batch layer is melted. However, if the electric furnace is to be restarted after the power has been interrupted for a period of time sufficient to allow the molten glass to cool below the critical temperature so that it has a relatively high resistivity, in the past it has been necessary to apply radiant heat to melt the cold top crust and the underlying molten glass to lower the resistivity to permit sufficient current flow for normal furnace operation. During this restart period, the undesirable emissions from the batch material and the products of combustion are generated.

An object of this invention is to facilitate the electric heating of molten glass.

A second object is to increase rapidly the temperature of molten glass which is heated electrically.

A third object is to avoid, during the campaign of a glass tank in which molten glass is heated electrically, the application of heat to the top of a mass of glass constituents.

A fourth object is to expand the range of molten glass temperature over which electric heating is effective to raise the molten glass to suitable melting, refining and working temperatures.

A fifth object is to enable the temperature of molten glass to be raised to the critical temperature for the electrical heating and tank parameters of the system at which normal electrical heating will increase the glass temperature.

Another object is to increase Joule effect heating in selected localized regions of molten glass.

SUMMARY OF THE INVENTION

In accordance with the above objects the present invention involves connecting electrodes which are supplied from separate current sources to impose their primary current flow and Joule effect heating on given zones of a molten glass mass so that a voltage and current flow occurs between the given zones. Various connections of low impedance conductive paths between the terminals of separate current sources are employed to serially connnect the sources across portions of the molten glass between electrodes in contact with the glass which are connected to terminals of the respective sources other than those having the low impedance path connections. With connection of one input terminal of each pair of the input terminals of two such electrode circuits so that terminals which are of opposite polarity during a portion of the voltage signal period are connected directly, the applied voltage between the other terminals is the algebraic sum of the voltages applied to the circuits. Thus where both circuits are from a single phase and of like applied voltage, the voltage imposed across the localized glass between those other terminals is twice the voltage of each source. In the case of polyphase circuits the interconnections, which in the illustrative embodiment are star connected, reduce the voltage increase by virtue of the out of phase segments of the applied voltages. The algebraic sum of the out of phase components can be altered in magnitude by adjustment of the phase relationships between sources, the polarization of those sources as they are connected to the electrodes, and the location of the intersource low impedance connection applied to the system. The most common available polyphase arrangement of sources is a three-phase supply in which each phase is spaced with a balanced 120° phase difference from its associated phases. Shifts between phase differences of 60° and 120° can be accomplished as by transformer polarization. While the invention applies to a two-phase balanced system in which the phases are in quadrature to impose a uniform increase in applied voltage for any interconnection of a terminal of each source, flexibility in the voltage magnitude imposed is illustrated for three phases of applied voltage having 60° phase angle differences at the connections to the glass contacting electrodes. Such phase angle differences provide instantantous voltage differences between electrodes mated to different sources having minor phase angle differences of 60° or major phase angle differences of 120°. Where the instantaneous phase angle difference across the region of glass to be subject to increased voltage is 120° the low impedance interconnection imposes 1.732 times the voltage applied by each source, where sine wave sources of voltage of like magnitude are assumed. The alternative connection of those electrodes across which an interphase instantaneous phase angle difference of 60° is applied will impose a voltage of the magnitude of the source where equal magnitude sources are involved. In each instance the current and voltage between mated electrodes, those of a group connected to the individual sources, are maintained. This higher voltage develops hotter regions in the molten glass more rapidly and from lower conductivity levels than with the usual electrode to source connections for normal heating.

DESCRIPTION OF THE PREFERRED EMBODIMENT

Figure 1:
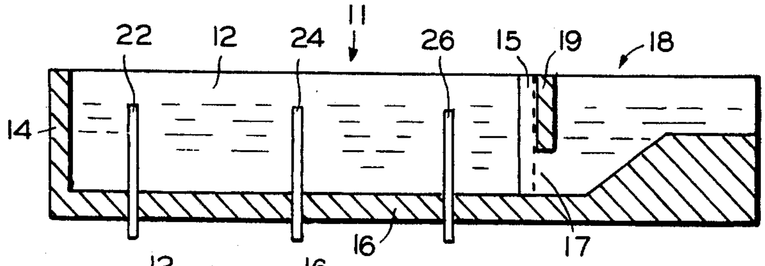
FIG. 1 is a cross-sectional view of a glass melting furnace taken along line 1—1 of FIG. 2.
Figure 2:
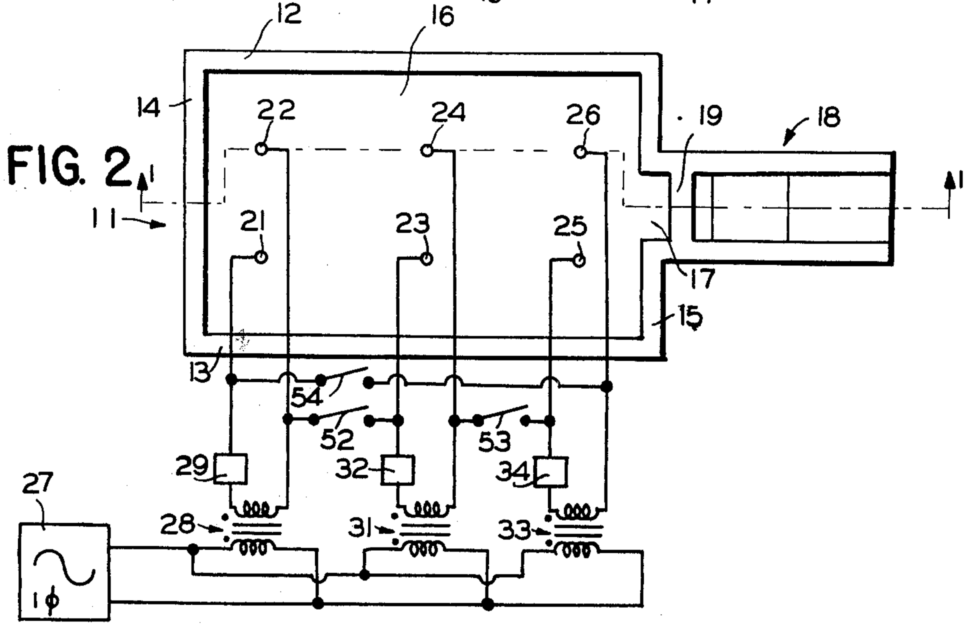
FIG. 2 is a plan view of the glass melting furnace of FIG. 1 showing a schematic of a power supply circuit utilizing sources of like phase to several heating zones in the molten glass according to the present invention.

Referring to FIGS. 1 and 2, there is shown a furnace for melting glass with furnace chamber 11 formed of sidewalls 12 and 13, rear end wall 14, front end wall 15 and floor 16. Batch material is melted in furnace chamber 11 and molten glass is drawn from furnace chamber 11 through throat 17 in front end wall 15 and into channel 18. Channel 18 distributes the molten glass to forehearths, not shown, for which the glass is drawn for the manufacture of various products. Skimmer block 19 extends down into the molten glass flowing through throat 17 to block any floating impurities or batch material from entering channel 18.

Cool batch material is added to furnace chamber 11 as the molten glass is drawn off to maintain a constant level of glass constituents in the furnace. Where the furnace has a crown or cover over the furnace chamber to collect the combustion products from fuel burners and the emissions from the molten glass, batch material is generally added at rear end wall 14 by conventional means, not shown. Furnace chamber 11 may also be open at the top where an upper layer of batch material is maintained on the molten glass heated electrically by Joule effect heating. In such as arrangement, that upper layer can cover substantially the entire upper surface of the molten glass to suppress the escape of the emissions. Typically, the batch layer is maintained by spreading batch material from a travelling hopper (not shown). Batch is melted into the underlying mass of molten glass at the batch-glass interface while the insulating batch layer maintains a relatively cool upper surface. However, when the available electric power is insufficient to bring the furnace up to operating temperaure, the additional heat has heretofore been supplied at the upper surface of the glass constituents by fuel burners which melt the batch blanket from this top downward. The present invention increases Joule effect heating and in many applications eliminates the need for fuel burners by applying additional electric power to the molten glass from the normal electrical heating sources for Joule effect heating.

Electrodes 21, 22, 23, 24, 25 and 26 extend through floor 16 into the molten glass contained in furnace chamber 11. Typically the electrodes are molybdenum rods of about 2 to 3 inches diameter. The tops of these electrodes are maintained below the upper surface of the molten glass since exposure to air or unmelted batch material will cause rapid erosion from oxidation and abrasion. Power supply 27 is a source of single phase alternating current which supplies power to each pair of electrodes through a transformer and controller. For example, transformer 28 has a primary winding connected to power supply 27 and a secondary winding connected between electrode pair 21 and 22. Current flows between electrodes 21 and 22 through the circuit formed by the secondary winding of transformer 28, controller 29 and the molten glass. Controller 29 typically may be a saturable reactor or oppositely polarized, parallel, silicon controlled rectifiers which are phase controlled to block current flow during selected portions of each voltage cycle which are usually symmetrical for each half cycle. The current flow between electrodes 21 and 22 is transformed into heat energy by the resistivity of the molten glass to produce Joule effect heating. Electrodes 23 and 24 are connected to the secondary winding of transformer 31 and controller 32 while electrodes 25 and 26 are connected to the secondary winding of transformer 33 and controller 34 to produce Joule effect heating in the middle and front end portions of furnace chamber 11 as electrodes 21 and 22 produce heating in the rear end portion. The voltage waveform between electrodes 21 and 22 is shown for two complete cycles or 720°, in FIG. 3A while FIG. 3B represents the voltage waveform between electrodes 23 and 24 for a similar interval. Since both electrode pairs receive power from power supply 27, the waveforms A and B are in phase. The voltage between electrodes 25 and 26 will have the same waveform as those in FIGS. 3A and 3B.

The thermal and electrical characteristics of glass in an electric furnace do not lend themselves to a simple analysis. Glass has a negative temperature coefficient of resistance which follows a curve of resistivity vs. temperature of generally exponential form. Thermal losses from a glass tank result in temperature gradients which tend to cause the glass at the tank sides and bottom to be cooler than that toward the tank interior. Placement of the electrodes is a factor in temperature gradient determinations since the greatest current density in the glass and thus the greatest Joule effect heating occurs in the vicinity of the electrodes. Since the electrodes are surrounded with molten glass a three dimensional electrical current flow occurs. The greatest electrical current flow should occur in the shortest path between electrodes of different potential. However, while high curent density in these regions should result in high heating by the Joule effect, the fluid condition of the molten glass and the resulting convection currents developed distort any thermal profile either in planes parallel to the molten surface or normal to that surface and either transverse or longitudinal of the glass flow to the station from which it is withdrawn from the glass tank. The withdrawal of molten glass and the addition of relatively cold batch also distort the thermal profiles achieved.

As a result of the complexities of the thermal profiles, the resistivity profiles and the electrical current flow paths in a mass of molten glass heated by the Joule effect, observed parameters of operation are quite different from those deduced from a simplistic analysis of the effects of the circuit connections of this invention. In particular, while in the explanation of the effect of the circuit connections below it has been assumed that the resistance of the electrical path in the molten glass between spaced electrodes is directly related to the distance between the electrodes, the results observed indicate that the change in resistance with change in spacing in the regions of concern is proportional to about the fourth root of the distance. This is attributed to the three dimensional current flow, the thermal variations, and the resistivity variations resulting from the negative temperature coefficient of resistance.

In one instance in which 250 kilowatts were dissipated between each of the paired electrodes in two adjacent zones in a tank of molten glass, the interconnection of electrodes of adjacent zones which are at different polarities, during a preponderance of their voltage cycles, resulted in an increase of total dissipation in the two zones from 500 kilowatts to 750 kilowatts. This represents a 50% increase in power without changing the applied voltage of the power sources. It has been observed that increase of from 50% to about 125% can be achieved in power dissipation where interconnected zones are supplied with in phase voltages. Where three phase voltages are applied to interconnected zones, power increases of up to a range of from 50% to about 75% have been realized when the zone electrodes are interconnected. This added power increases the temperature of the molten glass much more rapidly than is possible with the conventional connections of the zones.

Temperature control is achieved in the molten glass within a glass tank 11 by segregating the heat sources into regions or zones as defined by the interconnected electrodes. In FIG. 2 electrodes 21 and 22 define a first zone, 23 and 24 a second zone, and 25 and 26 a third zone. Different amounts of power may be applied to the several zones depending upon the heat required for processing the glass constituents therein as in melting batch, refining the molten glass, and conditioning the molten glass for withdrawal from the tank and ultimate utilization. Zone groupings can be of various forms. For example, it may be desirable to have two zones in each rank of electrodes along the longitudinal axis of the furnace (not shown) wherein the outer most electrode on one side of the furnace vertical longitudinal center plane is connected to the same source as the inner most electrode on the opposite side of that plane for both zones. These zones and their controls generally are provided to produce a desired thermal profile in the glass along its path of flow to the region from which it is withdrawn. Thus the interconnections between zones to impose added power according to this invention tend to disrupt the normal thermal profiles. This disruption is tolerable to establish temperatures in the molten glass from which desired thermal profiles can be developed by normal electrical zone control.

Ordinarily, only a limited range of electrical control is available in the zones since they are designed to supply power for normal stable operation with conduction in the controllers 29, 32 and 34 over about 90% to 95% of the voltage cycle. Even when a molten glass mass cools to temperatures below those required for the product desired and yet have the critical temperature below which normal electrical heating can be maintained and temperatures increased, as where the power to a tank 11 is down for a short period, the recovery with the controllers set at essentially 100% of the voltage cycle may take 4 to 5 hours. With the reconnections between zones according to this invention and the controller conducting essentially 100% of the voltage cycle, the mass of the same quantity in the same thermal system will raise to an operating temperature in 15 to 20 minutes.

The use of interconnected zones according to this invention involves establishing a condition which can run away if not properly monitored. That is, the negative temperature coefficient of resistance of the glass can cause the hotter glass to become of such low resistance as to overload and destroy the power sources. Accordingly as the current capacity limit of the sources is approached it is advantageous to return to the normal heating circuit connections for each zone whereby better thermal control of the system is afforded. Alternatively the phase angle of firing the SCRs of the controllers 29, 32 and 34 can be reduced.

The effect of connecting electrodes of different zones which are at different potentials now will be illustrated for a tank 11 supplied by three sources which are in phase and connected to three electrode pairs as shown in FIG. 2. For purposes of illustration the simplistic approach of considering pure sine waveforms, assuming straight line conductive paths between electrodes and assuming resistance proportional to the length of those paths will be employed.

Figure 4:
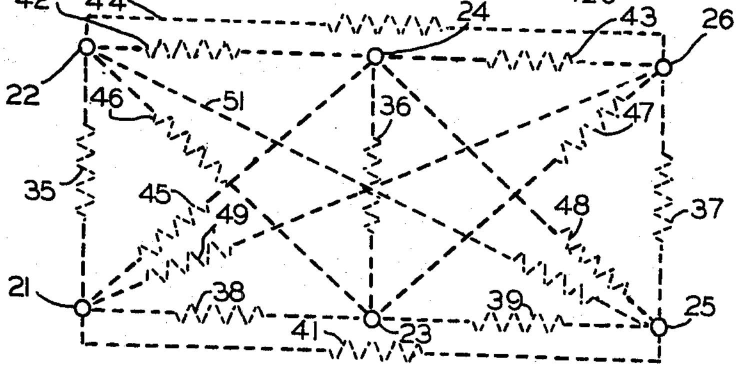
FIG. 4 is a schematic plan view of the electrodes shown in FIG. 2 and the approximate inter-electrode current paths employed for discussion purposes in illustrating the invention.

Although the output terminals from the secondary windings of transformers 28, 31 and 33 are connected to separate pairs of electrodes, the molten glass forms additional current paths between the electrode pairs. Referring to FIG. 4 there is shown the six electrodes of FIG. 2, electrodes 21 through 26, and the fifteen possible current paths between them taken two electrodes at a time. Current path 35 carrys current between electrodes 21 and 22 from the output terminals of the secondary winding of transformer 28 and controller 29 as shown in FIG. 2. If Vsin $(\omega t)$ represents the voltage applied between the electrodes in each pair, where V is the maximum amplitude of the sine wave and $\omega$ is the angular velocity, and $R_{35}$ represents the resistance of the molten glass forming current path 35, then the power generated along current path 35 is $P_{35} = (V\sin(\omega t))^2/R_{35}$ which is transformed into Joule effect heating. Current path 36 carries current between electrodes 23 and 24 from the output terminals of the secondary winding of transformer 31 and controller 32 as shown in FIG. 2. If $R_{36}$ represents the resistance of the molten glass forming current path 36, then the power generated along curent path 36 is $P_{36} = (V\sin(\omega t))^2/R_{36}$. In a similar manner the power generated along path 37, between electrodes 25 and 26, is $P_{37} = (V\sin(\omega t))^2/R_{37}$. Since electrodes 21, 23 and 25 are at the same potential there will be no current flow in current paths 38, 39 and 41 and therefore, no Joule effect heating. Electrodes 22, 24 and 26 are at the same potential so that there is no current flow in paths 42, 43 and 44 and therefore, no Joule effect heating.

Current paths 45 and 46 are in series and are included in a circuit with electrodes 21 and 24, the secondary winding of transformer 31, controller 32, electrodes 23 and 22, the secondary winding of transformer 28 and controller 29 of FIG. 2. If $R_{45}$ and $R_{46}$ represent the resistance of current paths 45 and 46 respectively and Vsin $(\omega t)$ represents the potential difference between electrodes 21 and 24 and electrodes 23 and 22, then the power dissipated along current path 45 is $P_{45} = (V\sin(\omega t))^2/R_{45}$ and the power dissipated along current path 46 is $P_{46} = (V\sin(\omega t))^2/R_{46}$. Current paths 47 and 48 are in series and are included in a circuit with electrodes 23 and 26, the secondary winding of transformer 33, controller 34, electrodes 25 and 24, the secondary winding of transformer 31 and controller 32 of FIG. 2. If $R_{47}$ and $R_{48}$ represent the resistances of current paths 47 and 48 respectively, then the power dissipated along these current paths is $P_{47} = (V\sin(\omega t))^2/R_{47}$ and $P_{48} = (V\sin(\omega t))^2/R_{48}$. Finally current paths 49 and 51 are in series and are included in a circuit with electrodes 21 and 26, the seconday winding of transformer 33, controller 34, electrodes 25 and 22, the secondary winding of transformer 28 and controller 29 of FIG. 2. If $R_{49}$ and $R_{51}$ represent the resistances of current paths 49 and 51 respectively, then the power dissipated along these current paths is $P_{49} = (V\sin(\omega t))^2/R_{49}$ and $P_{51} = (V\sin(\omega t))^2/R_{51}$. Therefore, the total power which is transformed into Joule effect heating is $P_T = P_{35} + P_{36} + P_{37} + P_{45} + P_{46} + P_{47} + P_{48} + P_{49} + P_{51}$.

The positioning of the electrodes in furnace chamber 11 of FIG. 2 is a function of the resistivity of the molten glass, the total power available from power supply 27 and the operating temperature required to be maintained for a predetermined number of electrodes and chamber size. In addition, there will be a temperature gradient, a decrease in temperature from the center portion of furnace chamber 11 to sidewalls 12 and 13 and front end wall 15 due to the heat losses through these walls and a sharp decrease in temperature at rear end wall 14 when the cool batch material is added at that region, which will cause a difference in resistance between two pairs of equally spaced electrodes. Therefore, the calculation of the total power available during normal operation and the increase in power supplied by the present invention will include the resistances between the pairs of electrodes each of which will be different. For the purpose of illustration, it will be assumed that the resistivity of the molten glass is uniform throughout furnace chamber 11 and that the spacing between pairs of electrodes is twice the distance between the electrodes in the pair. For example, in FIG. 4, the resistance of path 35, $R_{35}$, is equal to the resistance of path 36, $R_{36}$, and the resistance of path 38, $R_{38}$, is twice the resistance of path 35. Therefore, the power dissipated in each path may be written in terms of the resistance of one path so that the total power $P_T$ is a function of that one resistance.

If path 35 is selected as the reference resistance path, then $R_{35} = R_{36} = R_{37}$ and $P_{36} = (V\sin(\omega t))^2/R_{35}$ and $P_{37} = (V\sin(\omega t))^2/R_{35}$. Assuming that paths 35, 38 and 46 form a right triangle then $$R_{46} = \sqrt{(R_{35})^2 + (R_{38})^2} = \sqrt{(R_{35})^2 + (2R_{35})^2} = \sqrt{5(R_{35})^2} = 2.24\, R_{35}$$

and $P_{46} = (V\sin(\omega t))^2/(2.24\, R_{35})$ so that $P_{45} = P_{46} = P_{47} = P_{48} = (V\sin(\omega t))^2/(2.24\, R_{35})$. Finally, $$R_{49} = \sqrt{(R_{35})^2 + (2R_{38})^2} = \sqrt{(R_{35})^2 + (4R_{35})^2} = \sqrt{17\,(R_{35})^2} = 4.12\, R_{35}$$

and $P_{49} = (V\sin(\omega t))^2/(4.12R_{35})$ so that $P_{49} = P_{51} = (V\sin(\omega t))^2/(4.12\, R_{35})$. $P_T = P_{35} + P_{36} + P_{37} + P_{45} + P_{46} + P_{47} + P_{48} + P_{49} + P_{51} = 3\,(V\sin(\omega t))^2/R_{35}) + 4\,(V\sin(\omega t))^2/(2.24\, R_{35})) + 2(V\sin(\omega t))^2/(4.12R_{35})) = 5.28\,(V\sin(\omega t))^2/R_{35}$ which is the normal operating power under the assumed uniform resistivity. If the temperature of the molten glass drops below the normal operating temperature, $P_T$ will decrease as $R_{35}$ increases. The controllers 29, 32 and 34 of FIG. 2 are operating at 90% to 95% of the maximum RMS voltage, and cannot be increased significantly to increase $P_T$. Therefore, an additional source of heating must be utilized when the temperature of the molten glass has dropped below the critical temperature at which $P_T$ is not sufficient to raise it back to the normal operating point. The present invention includes an interconnection between the outputs from the secondary windings of transformers 28 and 31 with normally open switch 52. When the temperature of the molten glass in the area of electrode pairs 21 and 22 and 23 and 24 decreases, switch 52 is closed to short the current path 46 of FIG. 4 and place the voltage between electrodes 21 and 22 and the voltage between electrodes 23 and 24 across current path 45 between electrodes 21 and 24. These voltages add together as shown in FIG. 3C to produce a voltage which is twice the amplitude of the individual voltages. Therefore, after switch 52 closes $P'_{46} = 0$ and $P'_{45} = (2E\ V\sin(\omega t))^2/R_{45} = 4(V\sin(\omega t))^2/R_{45} = 4(v\sin(\omega t))^2/(2.24\ R_{35}) = 1.79\ (V\sin(\omega t))2/R_{35}$ and $P'_T = 5.28(V\sin(\omega t))^2/R_{35} - P_{45} + P'_{45} - P_{46} + P'_{46} = 5.28\ (V\sin(\omega t))^2/R_{35} - (V\sin(\omega t))^2/(2.24\ R_{35}) + 1.79\ (V\sin(\omega t))^2/R_{35} - (V\sin(\omega t))^2/(2.24\ R_{35}) + 0 = 6.17\ (V\sin(\omega t))^2/R_{35}$ which is an approximately 17% increase in the total power available for Joule effect heating. The additional current, imposed by connecting electrodes 22 and 23 together, which flows through controllers 29 and 32 will not overload these controllers since the resistivity of the molten glass increased as the temperature dropped so that the total current is not as high as when the glass is at normal operating temperature. When the molten glass reaches the temperature at which normal operating power will be sufficient to bring the glass up to operating temperature, switch 52 may be opened and $P_T = 5.28\ (V\sin(\omega t))^2/R_{35}$ again.

The present invention also includes an interconnection between the outputs from the secondary windings of transformers 31 and 33 with normally open switch 53. When switch 53 is closed current path 48 is shorted and there is an increase in the power available in the area between electrode pair 23 and 24 and pair 25 and 26 of approximately 17%.

$P'_{48} = 0$ and $P'_{47} = (2V\sin(\omega t))^2/R_{47} = 4\ (V\sin(\omega t))^2/R_{47} = 4(V\sin(\omega t))^2/(2.24R_{35}) = 1.79\ (V\sin(\omega t)^2/R_{35}$ and $P'_T = 5.28\ (V\sin(\omega t))^2/R_{35} - P_{47} + P'_{47} - P_{48} + P'_{48} = 5.28\ (V\sin(\omega t))^2/R_{35} - (V\sin(\omega t))^2/(2.24\ R_{35}) + 1.79\ (V\sin(\omega t))^2/R_{35} - (V\sin(\omega t))^2/(2.24\ R_{35}) + 0 = 6.17\ (V\sin(\omega t))^2/R_{35}$.

If both switch 52 and 53 are closed, there will be an increase in power of approximately 34%, $P'_T = 5.28\ (V\sin(\omega t))^2/R_{35} - P_{45} + P'_{45} - P_{46} + P'_{46} - P_{47} + P'_{47} - P_{48} + P'_{48} = 7.06\ (V\sin(\omega t))^2/R_{35}$.

A third interconnection between the outputs from the secondary windings of transformers 28 and 33 with normally open switch 54 may be utilized to short current path 49 and double the voltage applied to current path 51. If switch 54 is closed, $P'_{49} = 0$ and $P'_{51} = (2V\sin(\omega t))^2/R_{51} = 4(V\sin(\omega t))^2/(4.12\ R_{35}) = 0.97\ V\sin(\omega t))^2/R_{35}$. Therefore, $P'_T = 5.28\ (V\sin(\omega t))^2/R_{35} - P_{49} + P'_{49} - P_{51} + P'_{51} = 5.28\ (V\sin(\omega t))^2/R_{35} - (V\sin(\omega t))^2/c4.12\ R_{35}) + 0 - (V\sin(\omega t))^2/(4.12R_{35}) + 0.97\ (V\sin(\omega t))^2/R_{35} = 5.76\ (V\sin(\omega t))^2/R_{35}$ which is an approximately 9% increase in power. If switch 54 and either switch 52 or switch 53 is closed, then $P_T = 5.28\ (V\sin(\omega t))^2/R_{35} - P_{45} + P'_{45} - P_{46} + P'_{46} - P_{49} + P'_{49} - P_{51} + P'_{51} = 5.28\ (V\sin(\omega t))^2/R_{35} - (V\sin(\omega t))^2/(2.24\ R_{35}) + 1.79\ (V\sin(\omega t))^2/R_{35} - (V\sin(\omega t))^2/(2.24\ R_{35}) + 0 - (V\sin(\omega t))^2/(4.12\ R_{35}) + 0 - (V\sin(\omega t))^2/(4.12\ R_{35}) + 0.97\ (V\sin(\omega t))^2/R_{35} = 6.65\ (V\sin(\omega t))^2/R_{35}$ which is an approximately 26% increase in power. Finally, if switches 52, 53 and 54 are all closed, then $P_T = 5.28\ (V\sin(\omega t))^2/R_{35} - P_{45} + P'_{45} - P_{46} + P'_{46} - P_{47} + P'_{47} - P_{48} + P'_{48} - P_{49} + P'_{49} - P_{51} + P'_{51} = 5.28\ (V\sin(\omega t))^2/R_{35} - (V\sin(\omega t))^2/(2.24\ R_{35}) + 1.79\ (V\sin(\omega t))^2/R_{35} - (V\sin(\omega t))^2/(2.24\ R_{35}) + 0 - (V\sin(\omega t))^2/(2.24\ R_{35}) + 1.79\ (V\sin(\omega t))^2/R_{35} - (V\sin(\omega t))^2/(2.24\ R_{35}) + 0 - (V\sin(\omega t))^2/(4.12\ R_{35}) + 0 - (V\sin(\omega t))^2/(4.12\ R_{35}) + 0.97\ (V\sin(\omega t))^2/R_{35} = 7.52\ (V\sin(\omega t))^2/R_{35}$ which is an approximately 43% increase in power.

Referring to FIG. 2, it will be appreciated that the interconnection between electrodes 22 and 23 may alternately be made between electrodes 21 and 24, that the interconnection between electrodes 24 and 25 may alternately be made between electrodes 23 and 26 and that the interconnection between electrodes 21 and 26 may be alternately be made between electrodes 22 and 25 to produce the same power increases as are produced by the illustrated interconnections although the location of the effective heating in the molten glass will be in the region of the counterpart resistance diagonals of each electrode grouping as viewed in FIG. 4. Therefore, there are eight useful combinations of interconnections, three interconnections each with an alternate interconnection, which will produce the desired increase in power available for Joule effect heating. As viewed in FIGS. 2 and 4, some control of the region in which increased heating occurs is provided by the selection of interconnections. In the illustrated connections of FIG. 2, closure of switch 52 to connect electrodes 22 and 23 and short out resistance 46 concentrates the added Joule effect heating in the region represented by resistance 45. Had electrodes 21 and 24 been connected, the heating would have been in the region represented by resistance 46. Both of the regions of resistances 45 and 46 extend across the tank and since they are intersecting diagonals at least part of the increased heating occurs in the same region for either connection. A more significant difference in localized heating can be realized by other electrode connections. For example, if one side of the tank is cooled excessively, as in the region between electrodes 22 and 24 represented by resistance 42, that region can be subjected to increased heating by reversing the phase of the voltage to one of electrode pairs 21–22 or 23–24 so that electrodes 22 and 24 are at opposite polarities as are electrodes 21 and 23. Interconnection of electrodes 21 and 23 under these circumstances intensifies Joule effect heating in the region of resistance 42 by imposing the sum of the voltages applied from transformers 28 and 31 across resistance 42. Similar reconnections can localize the intensified heating in selected areas represented by the resistances 38, 39 and 43. Still further alterntive connections for intensified Joule effect heating in desired locations can be achieved with electrode arrays wherein other electrode pairs have the individual power sources connected across them as where the transformers 38 and 31 are respectively connected across electrode pairs 21–23 and 22–24 so that the sum of their voltages can be connected across the region of resistance 35 or 36 by appropriate interconnection of electrodes of opposite pairs. Thus, the region of resistance 36 can be subjected to the intensified heating if the single phase supplies are connected so that electrodes 23 and 24 are at opposite polarities and are interconnected by a circuit the equivalent of switch 52.

Therefore, the present invention is capable of supplying additional power to increase the temperature of molten glass. This is particularly advantageous when the temperature of such glass has decreased below the critical temperature at which the normal maximum operating voltage is not sufficient to bring the molten glass back to the operating temperature for the furnace. In the above example, a spacing ratio of two to one, the distance between adjacent pairs of electrodes being twice the distance between the electrodes in the pair, for six electrodes connected to a single phase power supply as calculated above produced a power increase or approximately 9% minimum when switch 54 was closed to an approximately 42% increase maximum when switches 52, 53 and 64 were closed. It should be recognized that in practice greater power increments have been achieved with the illustrated connections, presumably due to the inaccuracies in the assumptions made for illustration purposes. One or more of the switches may be closed to provide additional power to either the front or rear portions or all of furnace chamber 11. When the temperature of the molten glass has increased to the point where the normal operating voltage is sufficient to bring the molten glass up to the operating temperature, the switch or switches are opened.

The electrodes grouped for the respective individual sources in the illustrated embodiments have been represented as single elements coupled to each source and have been referred to as "electrode pairs " or "mated electrodes". It is known to electrically connect electrode elements in parallel and mount them in proximity to each other to effectively function as a single electrode. The arrangement is within the contemplation of this invention.

Mated electrodes are considered to establish normal heating zones and have been illustrated as orienting those zones transverse of the longitudinal axis of the tank 11. Such heating zones, while shown centered on the longitudinal axis of the tank, can be offset with respect to that axis and can be placed in other orientations by changing the orientation of the electrode groups by which they are defined. Thus electrode groups can be aligned in a skewed relation with respect to the tank longitudinal axis and can be aligned with that axis to concentrate their heat parallel to a sidewall. The secondary heating zones produced by summed voltages between electrodes of different groups will be shifted with these alternative primary zone orientations so that secondary zones can be transverse of the longitudinal axis of the tank or skewed thereto depending upon the selection of the electrodes to be interconnected with the low impedance current path.

Figure 5:
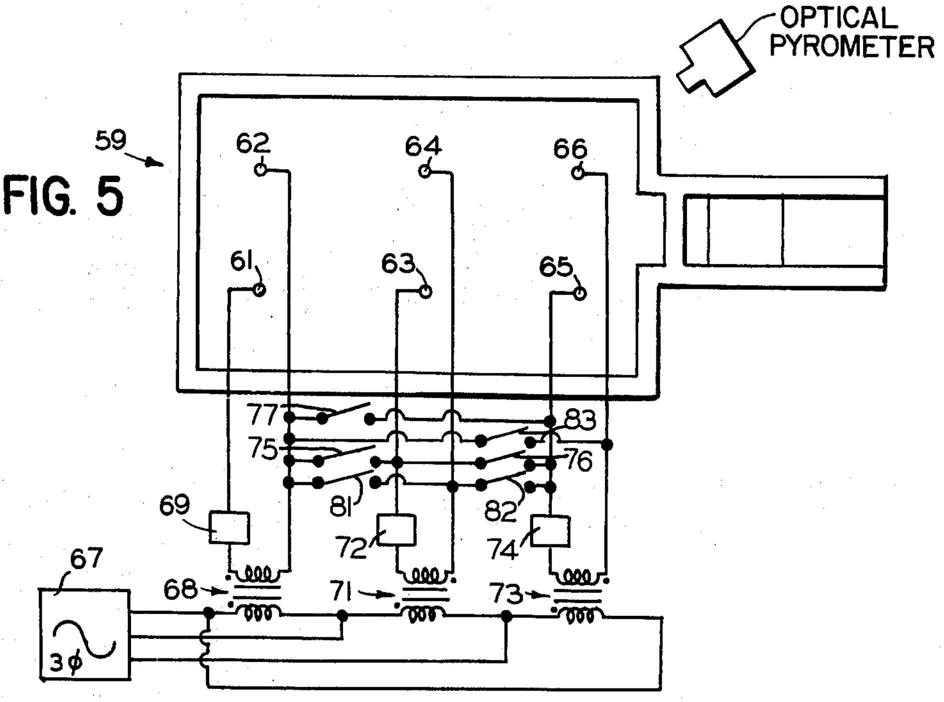
FIG. 5 is a plan view of the glass melting furnace of FIG. 1 showing a schematic of the present invention utilized with a three phase power supply with a number of interconnections which can be made selectively to realize different applied voltages across different regions of molten glass.

Referring to FIG. 5, there is shown an electric furnace substantially identical to the furnace of FIG. 2 with furnace chamber 59 and electrodes 61, 62, 63, 64, 65 and 66. However, power supply 67 is a source of three phase alternating current which supplies power to each pair of electrodes through a transformer and controller. The first phase of alternating current is applied to electrodes 61 and 62 through the transformer 68 and controller 69, the second phase is applied to electrodes 63 and 64 through transformer 71 and controller 72 and the third phase is applied to electrodes 65 and 66 through transformer 73 and controller 74. The inter-electrode voltage waveforms for the electrode pairs of FIG. 5 are shown in FIGS. 3D, 3E, 3G and 6B as being 60° out of phase. Assuming a peak voltage of V, waveform 3D may be designated as $V\sin(\omega t)$, waveform 3E as $V\sin(\omega t+60°)$ and waveform 3G as $V\sin(\omega t-60°)$ where +60° and −60° are phase angles of the second and third phases shifted 180° in transformers 71 and 73.

Two forms of electrode group interconnections are illustrated. With the sources connected to the electrode groups as shown, the serial connection of those sources can be selected to provide different magnitudes of voltage to different regions of the molten glass. The regions or secondary heating zones are between electrodes which are not connected by a low impedance current path and which are respectively mated with electrodes which are so connected. The magnitudes of the voltage applied across electrodes of groups supplied by two separate sources having phase differences in their waveforms depends upon the phase relationship of the voltages and the phase angle differences between the voltages imposed on the electrodes between which the secondary heating zone is developed. More particularly, with the illustrated 60° phase difference between source voltages applied to the several grouped electrodes, the source voltages can be connected by low impedance paths through switches 75, 76 and 77, so that they have a phase difference of 120° each. This arrangement applied 1.732V across the secondary Joule effect heating zones of the glass mass extending diagonally of the rectangular electrode array in the case of those zones between electrodes 61–64 and 61–66 and extending longitudinally of the array in the case of electrodes 64–66. A second phase relationship between the serially connected sources can be provided by switches 81, 82 and 83 to provide a 60° phase difference between source voltages. This arrangement applies voltage V across the secondary Joule effect heating zones of the glass mass between electrodes 61–63 and 61–65 longitudinal of the array, and between electrodes 63–66 extending diagonal of the array.

It groupings be appreciated from the following discussion of plural electrode groupsing having plural voltage sources which are shifted in phase with respect to each other that the magnitude and location of the voltages developed across the secondary Joule effect heating zones can be determined by the form of the electrode array, the phase difference between sources connected to the several electrode groupings, the connections chosen for the electrode groupings, and the low impedance connections made between electrode groupings. With sources shifted in phase to impose instantaneous voltages having phase angle differences between electrodes other than a quadrature relationship, different phase angle relationships can be chosen between electrodes of the different groups, as phase angle $\phi$ (120° in the example) or a major phase angle difference to provide a higher voltage, or, as phase angle $180° - \phi$ (60° in the example) or a minor phase angle difference, to provide a lower voltage but one still exceeding the voltages imposed when no low impedance connection is provided.

An interconnection including normally open switch 75 connects electrode 62 with electrode 63. When additional electrical power is required, switch 75 may be closed to short current path 46 of FIG. 4 thereby decreasing the total resistance and increasing the voltage presented to the inter-electrode voltages to increase current flow. The increased current flow creates more power dissipation in the area between electrode pair 61 and 62 and electrode pair 63 and 64. An interconnection including normally open switch 76 connects electrodes 63 with electrode 65. Switch 76 may be closed to short current path 39 of FIG. 4 thereby decreasing the total resistance presented to the inter-electrode voltages to increase current flow. The increased current flow creates more power dissipation in the area between electrode pair 63 and 64 and electrode pair 65 and 66. A third interconnection including normally open switch 77 connects electrode 62 with electrode 65. Switch 77 may be closed to short circuit current path 51 of FIG. 4 to create more power dissipation in furnace chamber 59. It will be appreciated that the interconnection between electrodes 62 and 63 may alternately be made between electrodes 61 and 64 that the interconnection between electrodes 63 and 65 may alternately be made between electrodes 64 and 66 and that interconnection between electrodes 62 and 65 may alternately be made between electrodes 61 and 66 to produce the same power increases as are produced by the illustrated interconnections. Further, the electrode pair voltage arrangements can be shifted in conjunction with appropriate interconnections by switches corresponding to 75, 76 and 77 to position the region of intensified Joule effect heating as desired, in the manner discussed with respect to FIG. 2.

When switch 75 is closed the inter-electrode voltages between electrodes 61 and 62, shown in FIG. 3D, and electrodes 63 and 64, shown as FIG. 3E, are star connected across current path 45 of FIG. 4. The addition in these voltages, $V\sin(\omega t) + V\sin(\omega t + 60°)$, produces the waveform shown in FIG. 3F between electrodes 61 and 64 which may be designated as $1.732\ V\sin(\omega t + 30°)$. When switch 76 is closed the inter-electrode voltages between electrodes 64 and 63 and electrodes 65 and 66. shown as FIG. 3G, are star connected across current path 43 of FIG. 4. The addition of these voltages, $V\sin(\omega t - 120°) + V\sin(\omega t - 60°)$, produces a waveform, not shown, between electrodes 64 and 66 which may be designated as $1.732\ V\sin(\omega t - 90°)$. Finally, when switch 77 is closed, the inter-electrode voltages between electrodes 61 and 62 and electrodes 65 and 66 are star connected across current path 49 of FIG. 4. The addition of these voltages, $V\sin(\omega t) + V\sin(\omega t - 60°)$, produces the waveform shown in FIG. 3H between electrodes 61 and 66 which may be designated as $1.732\ V\sin(\omega t - 30°)$.

When the three inter-electrode voltages are in phase, as shown in FIGS. 3A and 3B, the voltages will add together on current paths 45, 46, 47, 48, 49 and 51 to produce a voltage of greater magnitude than any one voltage taken alone. However, when the inter-electrode voltages are phased, as shown in FIGS. 3D, 3E and 3G, the voltages will add together to produce a phase shift and a lesser increase in magnitude, a factor of $\sqrt{3}$ or 1.732 as shown in FIG. 3F, than the in phase voltages, a factor of two as shown in FIG. 3C, along the same current path. The phased voltages will add together with an increase in magnitude along current paths 39, 43, 45, 46, 49 and 51 and will also add together with only a phase shift along current paths 38, 41, 42, 44, 47 and 48. Therefore, when the phased voltages are utilized, the decrease in power along some of the current paths as compared with in phase voltages is offset by additional power along current paths where no current flowed with in phase voltages so that the total power dissipated by the polyphased inter-electrode voltages is substantially the same as with voltages in phase. However, when the closing of switches 75, 76 and 77 reduces the total circuit resistance and places the inter-electrode voltages star connected along the current paths where no current flowed with in phase voltages, there is a greater power increase than with in phase voltages.

If the switch 75 of FIG. 5 is closed, there is an approximately 26.5% increase in power calculated with the above assumptions as compared with an approximately 17% increase in power calculated with those assumptions when the switch 52 of FIG. 2 is closed. If the switch 76 of FIG. 5 is closed there is also a power increase of approximately 26.5% since the inter-electrode voltages between electrodes 63 and 64 and electrodes 65 and 66 are star connected across the current path 43 of FIG. 4 which is shorter than the current path 45 of FIG. 4 which receives the increased current when the switch 75 is closed and the current paths 47 and 48, which receive the increased current when the switch 76 is closed, are longer than the current paths 38 and 42 which receive the increased current when the switch 75 is closed. This power increase is greater than the 17% increase in power when the switch 53 of FIG. 2 is closed since, when compared with the single phase circuit, the voltages across more current paths are increased in the star connected polyphase circuit. Finally, if the switch 77 is closed there is a power increase of approximately 14% as compared with a power increase of approximately 9% when the switch 54 of FIG. 2 is closed.

Figure 3:
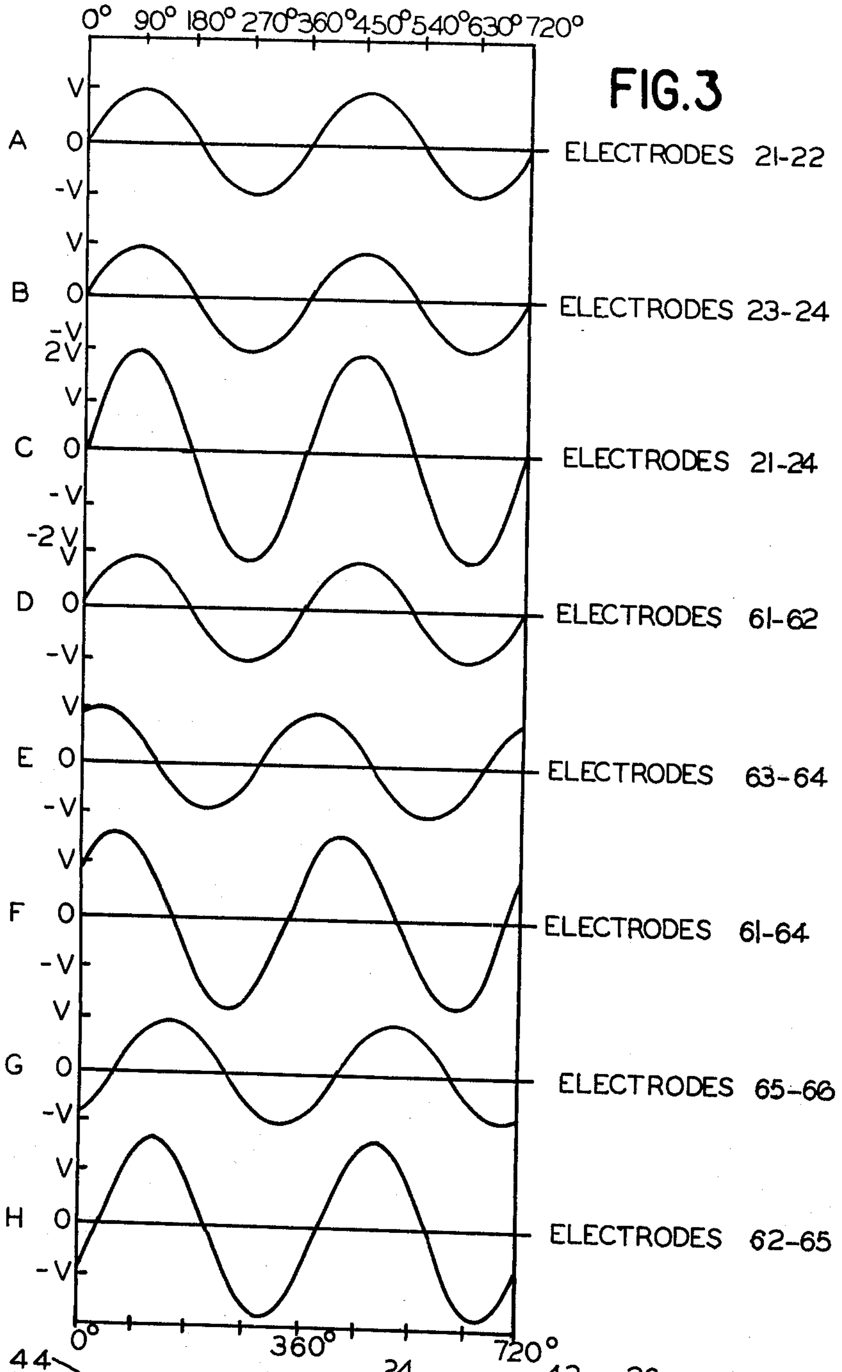
FIG. 3 shows various inter-electrode waveforms for the power supply circuits of FIGS. 2 and 5.
Figure 6:
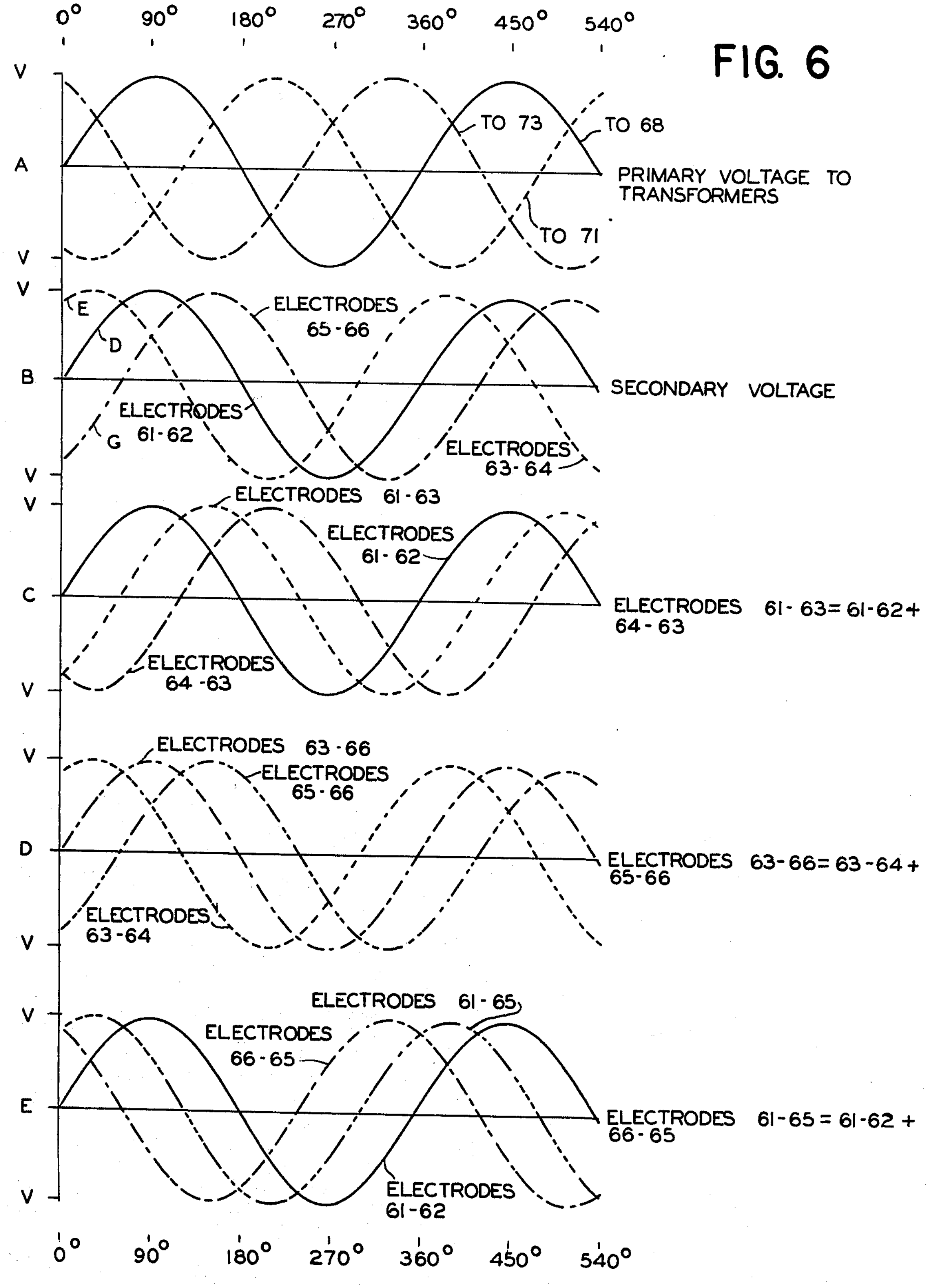
FIG. 6 shows various source and inter-electrode waveforms for the circuits of FIG. 5.

The waveforms illustrated in FIGS. 3 and 6 have assumed firing of the controls for the respective electrodes during 100% of the voltage cycle. Where less than 100% firing is utilized a notch will appear in the waveforms and the composite waveforms between electrode zones will have several notches which can be of different widths. This aspect of operation has not been illustrated since under conditions where maximum power is to be applied to the molten glass the firing phase will be essentially 100% for all zones. Further, the waveforms utilized for each zone have been of the same frequency in order that phase relationships be maintained. Equal voltages have been assumed to be imposed from each source to the zone electrodes although those voltages can be varied and in some instances, where different degrees of normal heating are utilized, they may be varied either by employing different peak voltages or by control of the firing phase in the respective controllers. Variations in the voltage values of the several sources are tolerable in the interconnections of the present invention although the maximizing of power suggests each source controller be operated at essentially 100% of the waveform and thus voltage differences ordinarily will be present when the interconnections of the invention are made only if peak values of applied voltage from the several sources differ.

While operation of the augmenting circuit has been discussed in the context of increasing the temperature of the entire mass of glass constituents in the tank as occasioned by a temperature drop due to a loss of power for an interval, it is to be appreciated that the invention also contemplates the rapid adjustment upward of the temperature of cool localized regions in the molten glass. When a cool region is sensed, as by a reduction in the current passed by one of the controllers 29, 32, or 34, by an optical pyrometer for a hot top molten glass mass, or by thermocouples in the tank walls or within the mass (not shown), increased voltage can be imposed either in that region or in its vicinity on a localized basis to develop greater Joule effect heating. As represented in FIG. 4 by the phantomed resistances between the electrodes, the region in which the effective serial connection of the sources normally supplying two furnace zones can be established selectively, for applying extra heating power in the general area of the resistances, by selection of the electrode connections and source polarizations to the zones involved. For example, if a cold region was detected along the diagonal between electrodes 21 and 24, the increased voltage can be imposed on the molten glass in that region by connecting electrodes 22 and 23 as by switch 52 of FIG. 2. This voltage would be imposed across the resistance represented as 45 in FIG. 4 and would result in increased Joule effect heating in that zone even while the Joule effect heating in the zones represented by resistances 35, 36 and 37 was maintained.

FIG. 5 also illustrates low impedance connections between electrode groups 61–62, 63–64, and 65–66 which increase the voltage imposed across glass mass portions. These increases are achieved by switches 81, 82 and 83 which serially connect the applied voltage shifted 60° in phase. It is to be understood that the switches 81, 82 and 83 are illustrated as alternative connections to those afforded by switches 75, 76 and 77 and that they are not to be closed in conjunction with 75, 76 or 77. Further, all three of switches 81, 82 and 83 should not be closed simultaneously. As shown in FIG. 6, the star connected three phase source 67 imposes voltages on primaries of transformers 68, 71 and 73 which are 120° apart. By inversion of the windings or terminal connections the secondary voltages are shifted 180° so that the secondary voltage for 71 as applied to electrodes 63–64, leads that of 68 by 60°, as applied to electrodes 61–62, and the secondary voltage for 73, as applied to electrodes 65–66, lags that of secondary 68 by 60° but, lags electrodes 63–64 by 120°.

Serial connection of the voltages across electrodes 61–62 and electrodes 64–63 is accomplished by connecting electrodes 62 and 64 through switch 81 thereby effectively inverting the voltage on electrodes 63–64 to achieve the 120° phase shift from that on electrodes 61–62 as shown in part C of FIG. 6. The cumulative voltage applied to path 38 of FIG. 4 is thus represented by the curve for electrodes 61–63 and is $V\sin(\omega t) + V\sin(\omega t + 120°) = V\sin(\omega t + 60°)$ of a magnitude and form equal to the applied voltage from each of the involved sources. Similarly, switch 82 applies voltage of V magnitude across the diagonal path 47 between electrodes 63 and 66 by summing voltages applied to electrodes 63–64 and electrodes 65–66 as shown in FIG. 6D while switch 83 sums voltages at electrodes 61–62 and electrodes 66–65 to impose voltage V between electrodes 61–66 of diagonal path 49 of FIG. 4 as shown in FIG. 6E.

Transportation of the switches 81, 82 and 83 and their connections to the counterparts of the electrodes they interconnect in FIG. 5 will shift the application of voltages of magnitude V to paths 42, 48 and 51 where the low impedance paths are between electrodes 61 and 63, electrodes 63 and 66, and electrodes 61 and 66 respectively.

As another example of localized heating by circuit reconnections, consider the region between electrodes 22 and 24 represented in FIG. 4 by resistance path 42. With the sources connected as shown in FIG. 2 electrodes 22 and 24 are at the same potential and the interconnection of electrodes 21 and 23 would effectively connect the sources 28 and 31 in opposition. This would not impose the increase voltage required for additional Joule effect heating. In order to connect series aiding sources across the resistance path, the input connections from one of the sources 28 and 31 to its respective electrode pair 21 and 22 or 23 and 24 and interchanged so that electrodes 22 and 24 are at opposite polarities. With such an interchange, sources 28 and 31 can effectively be serially connected across resistance path 42 by connecting electrodes 21 and 23, thereby increasing the Joule effect heating in the molten glass in the region of resistance path 42. While polarity reversal switches have not been shown between a controller and its electrode, as between 29 and 21, and the corresponding secondary of the transformer and its electrode, as from transformer 28 to electrode 22, whereby controller 29 is connected to electrode 22 and the secondary of 28 is connected to transformer 21, such switching means can be provided readily by one of ordinary skill where increased localized heating in a side region of the molten glass is desired.

As a general proposition the amount of voltage which can be developed by an interconnection of low impedance between electrodes connected to different sources is a function of the difference in instantaneous voltage between the respective electrodes mated with those interconnected electrodes over the voltage cycle. Thus the greater localized voltage increase is that illustrated in FIG. 2 where the instantaneous voltage values of the connected electrodes such as 22 and 23 and their respective counterparts 21 and 24 defining the localized zone are 180° out of phase. A somewhat lesser voltage increase is realized with polyphase sources where electrodes connected to the different sources and having a major phase angle difference in instantaneous voltage are connected as by switch 75 between electrodes 62 and 63 which have instantaneous voltages shifted 120° in phase. The same connection of polyphase power to the electrodes can provide a still lesser voltage where electrodes connected to the difference sources and having a minor phase angle difference in instantaneous voltage are interconnected to impose a still lesser voltage increase on the localized zone in the glass between their counterpart electrodes. This latter arrangement is illustrated by the connection through switch 81 between electrodes 62 and 64 which have instantaneous voltages 60° apart as shown in FIG. 6C. Of course, other polyphase arrangements having phase angle differences between the sources applying mated electrodes can be interconnected to provide major and minor phase angle differences which provide a greater and lesser respective voltage increase in a localized zone. When different electrodes of mated groups or source terminals of different sources having instantaneous voltages with major phase separation are connected, the greater voltage is achieved, while connection of those having lesser phase separation imposes the lesser voltage e.g. for sources shifted 45° in phase with respect to each other, the major phase difference between electrodes of the respective sources would be 180°–45° or 135° while the minor phase difference would be 45°.

The preceding discussion has been directed to paired electrodes supplied power from individual sources. It should be appreciated that other electrode groupings can be employed with one or more sources. For example, the invention is applicable to a three electrode grouping with ranks of three electrodes across the furnace width and the center electrode of one polarity while the other electrodes are of the opposite polarity. Further, arrays of electrode groups of greater numbers than three and in other than linear alignments can be employed with the interconnections for increased Joule effect heating according to this invention.

In summary, the present invention applies additional power to an electric glass melting furnace over that available with normal operation. When the temperature of the molten glass has decreased below the critical temperature at which the available normal operating power is not sufficient to bring the molten glass back to the operating temperature, the connections of this invention are particularly advantageous. The increase in power is accomplished by connecting together one electrode from each of two current source outputs which are at different potentials during at least a preponderant portion of each voltage signal period thereby shorting a current path through the molten glass and decreasing the total resistance presented to the inter-electrode voltages. Three general categories of increase in applied voltage to localized regions of the glass mass are achieved wherein the greatest is by connecting in series aiding relationship in phase voltage sources applied to electrode groups; a lesser voltage is achieved by connecting in series voltages which are shifted in phase with respect to each other and connected across electrode groups, so that their minor phase angle differences are reflected in the connection; and a still lesser voltage is achieved by connecting in series voltages which are shifted in phase with respect to each other and connected across electrode groups, so that their major phase angle differences are reflected in the connection. With polyphase supplies, a transition from a high intergroup voltage to a lower intergroup voltage can be made as the glass temperature increases to provide adjustment of the system which avoids a runaway condition as the glass resistance declines. This enables the power supplies to be designed with a capacity close to that required for normal operation yet enables abnormal conditions of cooled glass having higher than normal resistance to be overcome by localized intensification of Joule effect heating. When the additional power has increased the temperature of the molten glass above the critical temperature, the connection can be broken and normal heating can be maintained.

While there is explained and illustrated the preferred embodiment of my invention, it is to be understood that many variations in the method of and apparatus for providing additional power to raise the temperature of the molten glass for normal electric melting are within the concept of my invention. Accordingly, it is to be appreciated that the invention may be practiced otherwise than as specifically illustrated and described and that the electrode arrangements in the glass tank, the electrode zone interconnections, and the source arrangements are merely exemplary and are not to be read in a limiting sense.

I claim:

1. A system for heating molten glass by the Joule effect, comprising:

a chamber for containing glass constituents;

a first group of electrodes within said chamber;

means applying an alternating voltage across said first group of electrodes;

a second group of electrodes within said chamber;

means applying an alternating voltage across said second group of electrodes, whereby instantaneous voltage differences exist between certain electrodes of said second group and certain electrodes of said first groups; and means for concentrating an increase of electrical power dissipation in a path between at least one of said certain electrodes of each of said first and second groups by selectively connecting a low impedance current path between an other certain electrode of said first group and an other certain electrode of said second group which is at a different instantaneous voltage than said electrode of said first group a preponderance of the time alternating voltage is applied across said first and second electrode groups during those periods said low impedance current path is disconnected, whereby the algebraic sum of the instantaneous voltage applied across said first group and the instantaneous voltage applied across said second group is imposed across said path and the voltage difference across said glass between said other certain electrodes during those periods said low impedance current path is disconnected is effectively imposed across said path by said connecting means.

2. An electric furnace as defined in claim 1 wherein said connecting means includes a normally open switch.

3. An electric furnace as defined in claim 1 including a third group of electrodes within said chamber; a third means applying alternating voltage across said third group of electrodes, whereby instantaneous voltage differences exist between certain electrodes of said third group and certain electrodes of each of said second and first groups; second means for concentrating an increase of electrical power dissipation in a second path between at least one of said certain electrodes of each of said first and third groups by selectively connecting a second low impedance current path between an other certain electrode of said first group and an other certain electrode of said third group which is at a different instantaneous voltage than said electrode of said first group a preponderance of the time alternating voltage is applied across said first and third electrode groups during those periods said second low impedance current path is disconnected, whereby the algebraic sum of the instantaneous voltage applied across said third group is imposed across said second path and the voltage difference across said glass between said other certain electrodes during those periods said low impedance current path is disconnected is effectively imposed across said second path by said second connecting means.

4. An electric furnace as defined in claim 3 including third means for concentrating an increase of electrical power dissipation in a third path between at least one electrode of said second group and at least one electrode of said third group by selectively connecting a third low impedance current path between an electrode of said second group and an electrode of said third group which is at a different instantaneous voltage than said electrode of said second group a preponderance of the time alternating voltage is applied across said second and third electrode groups during those periods said third low impedance current path is disconnected, whereby the algebraic sum of the instantaneous voltage applied across said second group and the instantaneous voltage applied across said third group is imposed across said third path by said third connecting means.

5. A system according to claim 1 wherein said means applying an alternating voltage across said first group of electrodes applies a voltage of the same frequency and in phase with the alternating voltage applied by said means applying alternating voltage across said second group of electrodes.

6. A system according to claim 5 wherein said electrode of said first group and said electrode of said second group which are adapted to be selectively connected by said low impedance current path are of opposite polarity.

7. A system according to claim 3 wherein each of said means applying an alternating voltage across respective first, second and third groups of electrodes applies a voltage of the same frequency and phase.

8. Aa system according to claim 1 wherein each of said means applying an alternating voltage across respective first and second groups of electrodes applies a voltage of the same frequency, phase and magnitude.

9. A system according to claim 1 wherein each of said means applying an alternating voltage across respective first and second groups of electrodes applies a voltage of the same frequency and different phase.

10. A system according to claim 9 wherein said voltage applying means of said second group is shifted in phase to impose instantaneous voltage having a minor phase angle differrence between certain groupings of electrodes of said first group and with electrodes of said second group and a major phase angle difference between other groupings of electrodes of said first group with electrodes of said second group.

11. A system according to claim 10 wherein said low impedance current path is connected between an electrode of said first group and an electrode of said second group which have instantaneous voltages having a minor phase angle difference imposed by respective voltage applying means.

12. A system according to claim 10 wherein said low impedance current path is connected between an electrode of said first group and an electrode of said second group which have instantaneous voltages having a major phase angle difference imposed by respective voltage applying means.

13. A system according to claim 9 wherein said voltage applying means of said second group is shifted 60° in phase from said voltage applying means of said first group, and said electrode of said first group and said electrode of said second group which are adapted to be selectively connected by said low impedance current path have instantaneous voltages of like polarity a preponderance of the time alternating voltage is applied across said first and second electrodee groups.

14. A system according to claim 9 wherein said voltage applying means of said second group is shifted 60° in phase from said voltage applying means of said first group, and said electrode of said first group and said electrode of said second group which are adapted to be selectively connected by said low impedance current path have instantaneous voltages shifted 60° in phase with respect to each other.

15. A system according to claim 9 wherein said voltage applying means of said second group is shifted 60° in phase from said voltage applying means of said first group, and said electrode of said first group and said electrode of said second group which are adapted to be selectively connected by said low impedance current path have instantaneous voltages shifted 120° in phase with respect to each other.

16. A system according to claim 3 wherein each of said means applying an alternating voltage across respective first, second and third groups of electrodes applies a voltage of the same frequency and different phase to said first, second and third groups.

17. A system according to claim 16 wherein the voltages of each means applying an alternating voltage across respective first, second and third groups of electrodes are equal.

18. An electric furnace for resistive heating of molten glass, comprising:

a chamber for containing glass constituents;

a source of alternating voltage;

a first plurality of electrodes positioned within said chamber and connected to a first output of said voltage source;

a second plurality of electrodes positioned within said chamber with each of said electrodes of said second plurality spaced from each electrode of said first plurality less than the sum of the distance between the electrodes of said plurality having the greatest spacing and the spacing of the most proximate electrode in said first and second plurality and connected to a second output of said voltage source whereby the electrically resistive path lengths between electrodes of said first and second plurality are limited; and switching means for selectively connecting one of said first plurality of electrodes to one of said second plurality of electrodes which is at a different instantaneous voltage than said one of said first plurality of electrodes a preponderance of the time, whereby electrical power dissipation is increased in a path of glass localized between an electrode of said first plurality other than said one electrode thereof and an electrode of said second plurality other than said one thereof while said respective one electrodes are interconnected.

19. An electric furnace as defined in claim 18 including a third plurality of electrodes positioned within said chamber with each of said electrodes of said third plurality spaced from each electrode of said second plurality less than the sum of the distance between the electrodes of said second and third pluralities having the greatest spacing within their respective plurality and the spacing of the most proximate electrodes in said first and second plurality and connected to a third output of said voltage source whereby the electrically resistive path lengths between electrodes of said second and third plurality are limited; and second switching means for selectively connecting one of said second plurality of electrodes to one of said third plurality of electrodes which is at a different instantaneous voltage than said one of said second plurality of electrodes a preponderance of the time, whereby electrical power dissipation is increased in a path of glass localized between an electrode of said second plurality other than said one electrode thereof and an electrode of said second plurality other than said one thereof while said respective one electrodes are interconnected.

20. An electric furnace as defined in claim 19 wherein each elelctrode of said third plurality of electrodes is spaced from each electrode of said first plurality less than the sum of the distance between the electrodes of said first and third pluralities having the greatest spacing within their respective plurality and the spacing of the most proximate electrodes in said first and third plurality; and including switching means for selectively connecting one of said first plurality of electrodes to one of said third plurality of electrodes.

21. The method of heating molten glass by the Joule effect, comprising:

engaging the molten glass with at least first and second groups of electrodes wherein the electrodes are spaced apart in each group and the groups of electrodes are spaced apart;

applying alternating voltage to each group from a source individual to that group;

sensing the temperature of the molten glass in regions between the first and second groups;

connecting the sources to the respective electrode groups to impose opposite instantaneous electrical polarities for a preponderance of the alternating voltage period to electrodes of the first and second groups most proximate a region of the molten glass sensed as requiring an increase of temperature; and connecting the sources together in series aiding relation across the electrodes of the first and second groups most proximate a region of the molten glass sensed as requiring an increase of temperature.

22. The method according to claim 21 whereien the step of connecting the source together includes connecting a low impedance between the output terminals of the sources opposite those output terminals connected to the electrodes of the first and second groups most proximate a region of the molten glass sensed as requiring an increase of temperature.

23. In the method of heating molten glass by the Joule effect wherein molten glass is engaged with at least first and second groups of electrodes which are spaced apart in each group and which groups are spaced apart and wherein altenating voltage is applied to each group from a source individual to that group operated near capacity RMS voltage, the improvement comprising intensifying the Joule effect heating in the molten glass which comprises the steps of: connecting the source of the first group operated near capacity RMS voltage with the source of the second group operated near capacity RMS voltage in series aiding relation across at least one electrode of the first group and at least one electrode of the second group; and reducing the voltage between the first and second groups of electrodes prior to the increase in current between the electrode groups to a level imposing a capacity current on either of the sources.

24. The method according to claim 23 wherein the step of reducing the voltage between the first and second group of electrodes comprising disconnecting the series aiding relationship of the sources.

25. An electric furnace for resistive heating of molten glass comprising:

a chamber for containing glass constituents;

a source of alternating voltage;

a first plurality of electrodes positioned generally perpendicular and located along a first generally straight line within said chamber;

first means deriving a first voltage from said voltage source for application across said first plurality of electrodes;

a second plurality of electrodes positioned generally perpendicular and located along a second generally straight line with said chamber parallel to said first line and spaced from said first line a distance no more than about twice the spacing of either of said plurality of electrodes;

second means deriving a second voltage from said voltage source for application across said second plurality of electrodes; and low impedance means for connecting a given electrode of said first plurality to a given electrode of said second plurality; means connecting said respective first and second voltages to said given respective electrodes to impose different instantaneous voltages thereon a preponderance of the time, whereby the algebric sum of applied voltages is applied across a resistive path of glass between said first and second plurality of a magnitude to produce augmenting Joule effect heating.

* * * * *